US009827498B2

United States Patent
Li et al.

(10) Patent No.: US 9,827,498 B2
(45) Date of Patent: Nov. 28, 2017

(54) DYNAMIC GAMING EXPERIENCE ADJUSTMENTS

(71) Applicant: Empire Technology Development LLC, Wilmington, DE (US)

(72) Inventors: Daqi Li, Shaanxi (CN); Jun Fang, Shaanxi (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 182 days.

(21) Appl. No.: 14/408,768

(22) PCT Filed: Jan. 3, 2014

(86) PCT No.: PCT/CN2014/070074
§ 371 (c)(1),
(2) Date: Dec. 17, 2014

(87) PCT Pub. No.: WO2015/100727
PCT Pub. Date: Jul. 9, 2015

(65) Prior Publication Data
US 2016/0271497 A1     Sep. 22, 2016

(51) Int. Cl.
*A63F 13/00* (2014.01)
*A63F 13/67* (2014.01)
*A63F 13/212* (2014.01)

(52) U.S. Cl.
CPC ............ *A63F 13/67* (2014.09); *A63F 13/212* (2014.09)

(58) Field of Classification Search
CPC ........ A63F 13/20; A63F 13/21; A63F 13/212; A63F 13/213; A63F 13/217
(Continued)

(56) References Cited

U.S. PATENT DOCUMENTS

2006/0281543 A1* 12/2006 Sutton ..................... G07F 17/32
463/29
2009/0248594 A1* 10/2009 Castleman ............ G06F 9/4446
706/11
(Continued)

FOREIGN PATENT DOCUMENTS

CN          102068263 A       5/2011
CN          102394919 A       3/2012
CN          102614661 A       8/2012

OTHER PUBLICATIONS

"Dynamic game difficulty balancing," Wikipedia, accessed at https://web.archive.org/web/20111212020340/http://en.wikipedia.org/wiki/Dynamic_game_difficulty_balancing, last modified on Aug. 21, 2011, pp. 1-5.
(Continued)

*Primary Examiner* — James S McClellan
(74) *Attorney, Agent, or Firm* — Brundidge & Stanger, P.C.

(57) ABSTRACT

Technologies are generally described to dynamically alter a game while a gamer is playing the game so as to affect the gaming experience experienced by the gamer. According to some examples, one or more physiological signals may be collected from a gamer as the gamer is playing a game. Based on the collected physiological signals, a Quality of Experience (QoE) vector that indicates the gaming experience of the gamer may be generated. The QoE vector may then be compared with a corresponding value of a predetermined QoE function, and the game may be altered based on the comparison.

23 Claims, 5 Drawing Sheets

(58) Field of Classification Search
USPC .................................................... 463/36, 42
See application file for complete search history.

(56) References Cited

U.S. PATENT DOCUMENTS

| | | | |
|---|---|---|---|
| 2011/0009193 A1* | 1/2011 | Bond | A63F 13/212 463/36 |
| 2013/0120114 A1* | 5/2013 | Gu | G06F 7/02 340/5.83 |

OTHER PUBLICATIONS

"Quality of experience," accessed at https://web.archive.org/web/20130503211747/http://en.wikipedia.org/wiki/Quality_of_experience, last modified on Mar. 25, 2013, pp. 1-4.

Charles, D., et al., "Player-Centred Game Design: Player Modelling and Adaptive Digital Games," Digital Games Research Group, Proceedings of DiGRA 2005 Conference: Changing Views—Worlds in Play, pp. 1-14 (Jun. 2005).

Dickey, M. D., "Game design and learning: a conjectural analysis of how massively multiple online role-playing games (MMORPGs) foster intrinsic motivation," Education Tech Research Dev, vol. 55, Issue 3, pp. 253-273 (Jun. 2007).

International Search Report and Written Opinion for International Application No. PCT/CN2014/070074 mailed on Oct. 14, 2014.

Lassalle, J., et al., "Combination of physiological and subjective measures to assess quality of experience for audiovisual technologies," Third International Workshop on Quality of Multimedia Experience (QoMEX 2011), pp. 13-18 (Sep. 7-9, 2011).

Salimpoor, V. N. et al., "Anatomically distinct dopamine release during anticipation and experience of peak emotion to music," Nature Neuroscience, vol. 14, No. 2, pp. 257-262 (Jan. 9, 2011).

Tan, C. H., et al., "Dynamic Game Difficulty Scaling Using Adaptive Behaviour-Based AI," IEEE Transactions on Computational Intelligence and AI in Games, vol. 3, Issue 4, pp. 289-301 (Jun. 2011).

Wang, W. and Li, B., "To Play or to Control: a Game-based Control-theoretic Approach to Peer-to-Peer Incentive Engineering," Quality of Service—IWQoS, vol. 2707, pp. 174-192 (May 27, 2003).

Yannakakis, G.N., and Hallam, J., "Real-Time Game Adaptation for Optimizing Player Satisfaction, IEEE Transactions on Computational Intelligence and AI in Games," vol. 1, No. 2, pp. 121-133 (Jun. 2009).

* cited by examiner

DYNAMIC GAMING EXPERIENCE ADJUSTMENTS

CROSS-REFERENCE TO RELATED APPLICATION

This Application is the U.S. National Stage filing under 35 U.S.C. §371 of International Application No. PCT/CN2014/070074, filed on Jan. 3, 2014. The disclosure of the International Application is hereby incorporated by reference in its entirety.

TECHNICAL FIELD

The technologies described herein pertain generally to adjusting gaming experience provided by a game in accordance with emotional responses of a gamer.

BACKGROUND

Unless otherwise indicated herein, the approaches described in this section are not prior art to the claims in this application and are not admitted to be prior art by inclusion in this section.

A game, when played, may provide a similar gaming experience to different gamers. The gaming experience may be measured to indicate emotional responses from a gamer. However, due to demographic differences among different gamers, such as age, gender, personality, a gamer may want the gaming experience customized accordingly.

SUMMARY

Technologies are generally described for facilitating dynamic gaming experience adjustments. The various techniques described herein may be implemented in various methods, systems, and/or computer-readable mediums.

In some examples, various embodiments may be implemented as methods. Some methods may include collecting one or more physiological signals from a gamer as the gamer is playing a game; generating, based on the one or more physiological signals, a Quality of Experience (QoE) vector that indicates the gaming experience of the gamer; comparing the generated QoE vector with a corresponding value of a predetermined QoE function; and altering the game based on the comparison.

In some examples, various embodiments may be implemented as systems. Some systems may include a signal collector configured to collect one or more physiological signals from a gamer when the gamer is experiencing a game hosted on a gaming device, and generate, based on the one or more physiological signals, a Quality of Experience (QoE) vector that indicates a gaming experience of the gamer; and a control module, communicatively coupled to the signal collector, configured to compare the QoE vector with a corresponding value of a predetermined QoE function, and alter the game, responsive to determination that the QoE vector is greater or less than the corresponding value of the predetermined QoE function.

In some examples, various embodiments may be implemented as computer-readable mediums having executable instructions stored thereon. Some computer-readable mediums may store instructions that, when executed, cause one or more processors to perform operations comprising receiving one or more physiological signals of a gamer from a signal collector when the gamer is experiencing a game; receiving, from the signal collector, a Quality of Experience (QoE) vector generated based on the one or more physiological signals to indicate a gaming experience of the gamer; comparing the QoE vector with a corresponding value of a predetermined QoE function; altering the game, responsive to determination that the QoE vector is not equal to the corresponding value of the predetermined QoE function.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings.

DETAILED DESCRIPTION

Figure 1:
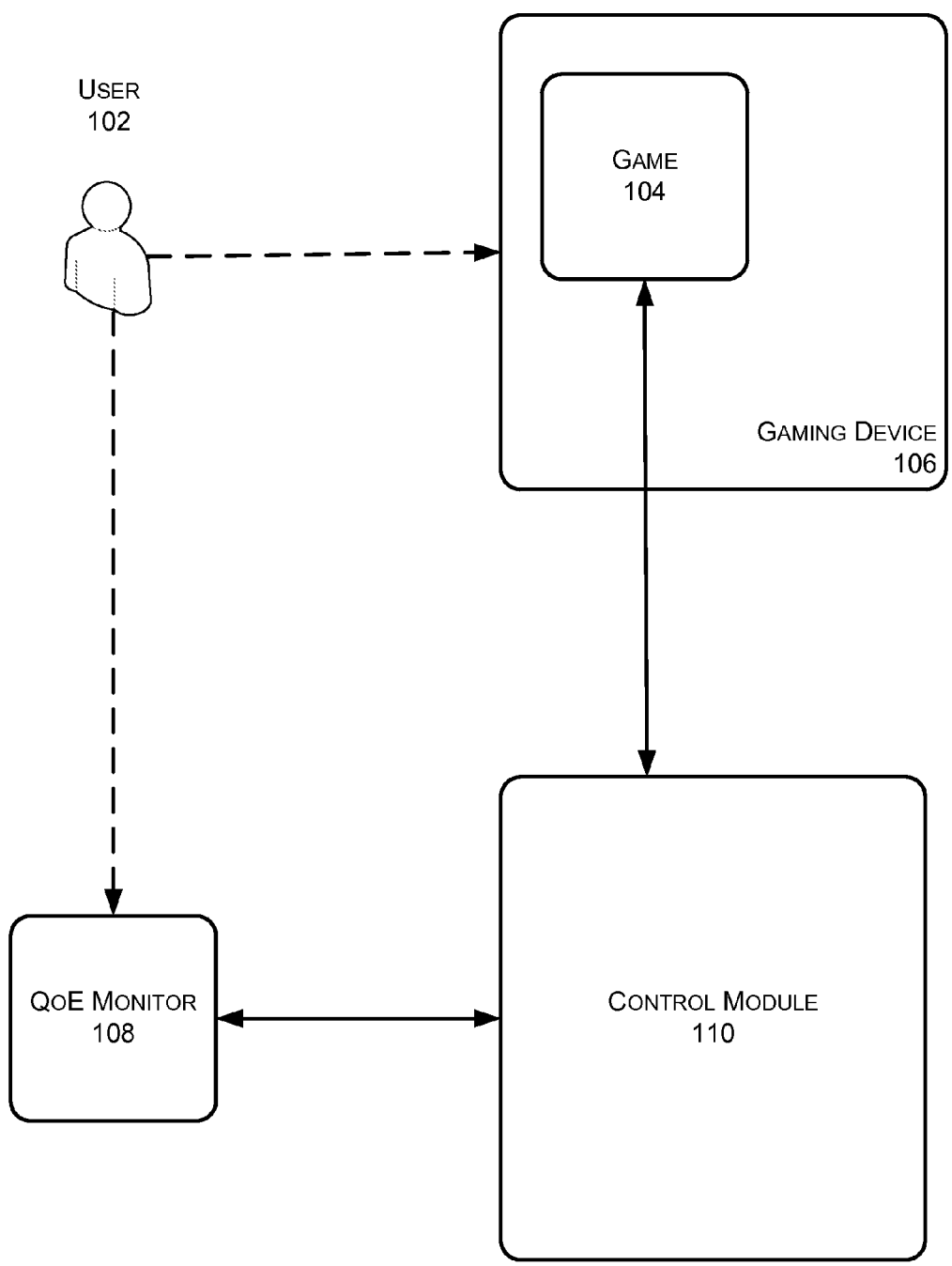
FIG. 1 shows an example gaming environment in which dynamic gaming experience adjustments may be implemented.

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

When a gamer plays a game, the gamer's physiological signals, such as facial expression, heart rate, breath frequency, pulse, etc., may be an indication of the gamer's emotional response as the gamer is playing the game. These physiological signals may be collected using one or more devices to generate a QoE vector, which represents the emotion of the gamer while the gamer is playing the game.

The QoE vector may then be compared with a corresponding value of a QoE function. The QoE function may indicate a target or expected emotion that the gamer should experience as the gamer is playing the game. The QoE function generates values (QoE function values) that vary with time (the duration or length of time the game is being played). The QoE function may be selected from one or more candidate QoE functions in accordance with one or more factors such as, by way of example, the gamer's age, gender, medical history, etc. The gamer may alternatively create or specify a QoE function as desired by, for example, modifying one of the candidate QoE functions. When the QoE vector diverges from its corresponding QoE function value by a sufficient or predetermined amount (e.g., QoE vector is greater or less than the corresponding QoE function value by a predetermined amount), adjustments may be implemented to alter the game in a manner as to affect the gamer so that subsequent QoE values (the QoE values measured in subsequent or following time periods) convergence to corresponding QoE function values (QoE function values corresponding to the following time periods). In this manner, the gamer's emotions may be regulated to track a targeted emotion, as represented by the QoE function during the playing of the game.

FIG. 1 shows an example gaming environment 100 in which dynamic gaming experience adjustments may be implemented, arranged in accordance with at least some embodiments described herein. As depicted, example gaming environment 100 may include at least a user 102, a game 104 hosted on a gaming device 106, a QoE monitor 108, and a control module 110.

User 102 may refer to a person, or a gamer, who may interact with gaming device 106 and may receive visual and/or audio feedback on a display device in response to such interactions.

Game 104 may refer to a software component hosted on gaming device 106 or in a cloud computing environment, which may be configured to involve human interactions with a user interface to generate the visual and/or audio feedback on the display device. In some examples, game 104 may be configured to assign virtual gaming tasks for user 102 to accomplish in a virtual scene, such as to slaughter a dragon in its den, to collect a number of virtual items, e.g., magic mushrooms to save a sick rabbit, etc. When user 102 accomplishes the one or more of the assigned virtual gaming tasks, user 102 may be rewarded with other virtual items or rewards, such as virtual coins, equipment for an avatar of user 102, gaming points, etc. Typically, the difficulty of game 104 may be predetermined by user 102 before game 104 starts, and user 102 may receive greater rewards upon accomplishing more difficult virtual tasks.

Gaming device 106 may refer to a computing device that hosts game 104, which may include the display device that may produce two or three dimensional images, a gaming platform, and input devices for user 102 to manipulate portions of game 104. The gaming platform may refer to a personal computer, a game console (e.g., Xbox®, PlayStation®, etc.), or a handheld mobile device (e.g., iPhone®). The input devices, which may be referred to as game controllers, may include a joystick, a steering wheels, buttons, thumb controllers, keyboards, mice, etc.

QoE monitor 108 may refer to a component configured to periodically collect one or more physiological signals from user 102 and, further, generate a QoE vector that indicates a real-time gaming experience of user 102 based on the collected physiological signals. The physiological signals may include at least one of blood pressure, breath frequency, pulse, voice characteristics (tone, pitch, volume, etc.), facial expression, changes in body temperature, brain activity, etc. Thus, the periodically collected physiological signals may indicate or be representative of the emotional responses of user 102 or the emotions being experienced by user 102 while playing game 104 and, therefore, the gaming experience of user 102 at different times during the playing of game 104. QoE monitor 108 may further be configured to digitize the physiological signals to generate the QoE vector.

The QoE vector may refer to a vector, each element of which may represent a value of one of the digitized physiological signals. For example, a QoE vector may be generated based on collected physiological signals including blood pressure, breath frequency, pulse, voice characteristics (tone, pitch, volume, etc.), facial expression, changes in body temperature, brain activity, etc. A non-limiting example of QoE vector may then be referred to as $\bar{e}_i = \{w_1, w_2, w_3\}$, where $w_1$ may represent a digitized value of the blood pressure of user 102, $w_2$ may represent a digitized value of the breath of user 102, and $w_3$ represents a digitized value of the pulse of user 102. Non-limiting examples of QoE monitor 108 may include a camera, a microphone, a sphygmomanometer, an electroencephalography monitor, a heart rate monitor, a thermal imaging camera, one or more combinations thereof, etc. For example, QoE monitor 108 may be implemented as a heart rate monitor integrated in a game controller or a thermal imaging camera in a motion sensing device, e.g., Kinect®. The QoE vector may be generated periodically and transmitted to control module 110.

Control module 110 may refer to a component configured to compare the generated QoE vector with a corresponding value of a predetermined QoE function. The predetermined QoE function may generate a QoE value that varies with time $t_i$, which may be referred to as $e_i^c$. At a given time on the time domain of the QoE function, the QoE function corresponds to or generates a corresponding reference QoE value. The QoE function may be specifically designed for user 102 or a group of target users. For example, a QoE function designed for teenage gamers may differ from the QoE function for senior gamers. More specifically, the QoE function designed for teenage gamers may fluctuate more drastically. Further, the QoE values generated by the QoE function designed for teenage gamers may be generally higher than those generated by the QoE function designed for more senior gamers. In at least some examples, less fluctuating QoE functions may be designed for senior gamers to avoid health issues such as heart attack. Control module 110 may be configured to retrieve personal information from user 102, such as, age, gender, physical condition, etc., to select or identify an appropriate QoE function to load before game 104 starts. In at least one example, control module 110 may be configured to allow user 102 to select a desired QoE function from a list of provided QoE functions. In other examples, control module 110 may provide a series of questions or prompts to user 102 and, based on user 102's responses, generate, customize or identify an appropriate QoE function for user 102. Control module 110 may also be configured to compare the periodically generated QoE vector with a corresponding value of the predetermined QoE function, which may be referred to as $e_i^c$. The distinction between the generated QoE vector and the corresponding value may be referred to as $\Delta_{QoE}$ and be calculated as $$\Delta_{QoE} = |\overline{e_i}| - e_i^c = \frac{|\alpha \cdot w_1 + \beta \cdot w_2 + \gamma \cdot w_3|}{h} - e_i^c,$$

in which α, β, γ, and h are representative of adjustable parameters. The adjustable parameters may each be customized to indicate the importance of a type of the physiological signals in measuring the emotional responses of user 102.

Further, control module 110 may be configured to adjust a real-time gaming experience for user 102 in response to a determination that the QoE vector is greater than the corresponding value of the predetermined QoE function $e_i^c$ by altering game 104. That is, the QoE vector of user 102 to be measured in a next time period may be affected to be closer to, or to converge on, the QoE function than the currently measured QoE vector. For example, control module 110 may be configured to provide visual or audio effects that are intended to calm user 102 or to lower the excitement level of user 102. Thus, the QoE vector generated based on physiological signals of user 102 may also be lowered. For example, assuming the game provider of game 104 has permitted control module 110 to alternate portions of game 104, control module 110 may be configured to alter game 104 by increasing the delay of gaming device 106 with a latency controller in response to the instructions of user 102. Other methods for altering game 104 may include increasing the difficulty of game 104, simplifying the gaming scene, and/or repeating a same gaming task. In at least some examples, control module 110 may be configured, by altering game 104 for a senior gamer, to avoid potential health issues, e.g., cardiac issues caused by the excitement of game 104.

Further, in response to a determination that the QoE vector is less than the corresponding value of the predetermined QoE function $e_i^c$, control module 110 may also be configured to adjust the real-time gaming experience for user 102 by altering game 104. Similarly, the QoE vector of user 102 to be measured in a next time period may be affected to be closer to, or to converge on, the QoE function than the currently measured QoE vector. For example, control module 110 may be configured to provide visual or audio effects that are intended to encourage user 102 or to raise the excitement level of user 102. Thus, the QoE vector generated based on physiological signals of user 102 may be raised. Non-limiting examples of methods for altering game 104 may include decreasing the difficulty of game 104, modifying a gaming scene, changing the background music, rewarding user 102, etc.

Thus, example gaming environment 100 may include components configured to implement dynamic gaming experience adjustments for user 102 in response to the emotional responses of user 102 that are reflected by the physiological signals collected by QoE monitor 108.

Figure 2:
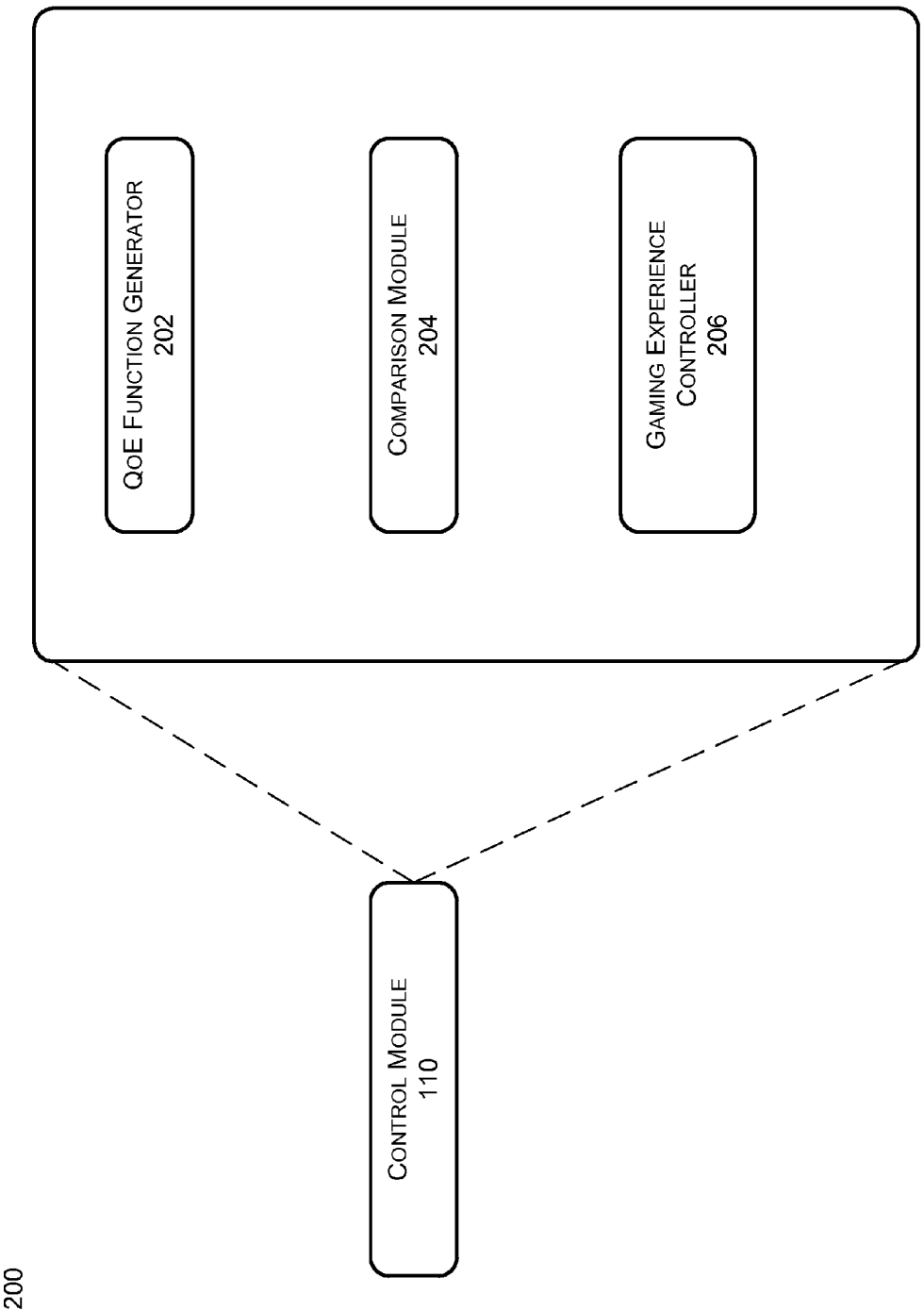
FIG. 2 shows an example configuration of a control module by which dynamic gaming experience adjustments may be implemented.

FIG. 2 shows an example configuration 200 of control module 110 by which dynamic gaming experience adjustments may be implemented, arranged in accordance with at least some embodiments described herein. As depicted, control module 110, described above with regard to FIG. 1, may include at least a QoE function generator 202, a comparison module 204, and a gaming experience controller 206.

QoE function generator 202 may refer to a component that may be configured to select from one or more predetermined QoE functions based on retrieved personal information from user 102. The one or more QoE functions may be predetermined, or designed, by QoE function generator 202 for different types of users based on characteristics or demographics including gender, age, physical condition, medical history, personal preference, etc. In a non-limiting example, since senior gamers, e.g., those over age 30, may enjoy a game that provides gradually increasing excitement, a QoE function predetermined for such senior gamers may be shown as a curve that indicates the QoE value increases gradually and reaches a peak at a late stage of game 104. To the contrary, a QoE function predetermined for teenage gamers may be shown as a curve that indicates the QoE value fluctuates drastically and reaches a peak at an early state of game 104. User 102 may select one from the one or more predetermined QoE functions and modify the QoE function as she or he wishes even while playing game 104. In some other examples, QoE function generator 202 may be configured to provide one or more questions and, further, generate a customized QoE function in accordance with answers given by user 102. For example, QoE function generator 202 may be configured to generate one or more questions, e.g., "what is your favorite game," "what is your favorite music," etc., and further generate a customized QoE function for user 102 based on the answers provided by user 102. Further to the example, a QoE function with drastic fluctuation may be then customized and provided for a user who likes rock music and first-person shooter (FPS) game.

Alternatively, QoE function generator 202 may be configured to modify a selected one of the QoE functions based on personal information input by user 102 or collected from user 102. In a non-limiting example, QoE function generator 202 may select a QoE function originally designed for senior gamers for a young gamer if the medical history of the young gamer indicates that a less strenuous gaming experience may be more appropriate. As a further alternate embodiment, QoE function generator 202 may initialize a new QoE function in accordance with demands from user 102. Even further, user 102 may review, comment on, or share the selected QoE function so that other users may select, modify, or disregard the QoE function accordingly. In accordance with various embodiments, QoE function generator 202 may be implemented as hardware, software, firmware, or any combination thereof.

Comparison module 204 may refer to a component configured to compare the QoE vector generated by QoE monitor 108 with a corresponding value of the selected predetermined QoE function. Assuming QoE monitor 108 is configured to collect one or more physiological signals from user 102 and generate the QoE vector, e.g., every five minutes, comparison module 204 may be configured to compare the generated QoE vector with a corresponding value of the predetermined QoE function at five minute intervals. The distinction between the generated QoE vector and the corresponding value may be calculated as $$\Delta_{QoE} = |\overline{e_i}| - e_i^c = \frac{|\alpha \cdot w_1 + \beta \cdot w_2 + \gamma \cdot w_3|}{h} - e_i^c,$$

in which α, β, γ, and h are representative of adjustable parameters. The adjustable parameters may each be customized to indicate the importance of a type of the physiological signals in measuring the emotional responses of user 102. In accordance with various embodiments, comparison module 204 may be implemented as hardware, software, firmware, or any combination thereof.

Gaming experience controller 206 may be configured to alter game 104 to further affect the gaming experience of user 102 based on the comparison result generated by comparison module 204 by altering game 104 the QoE vector of user 102. That is, gaming experience controller 206 may be configured to alter game 104 responsive to a determination that the QoE vector is greater or less than the corresponding value of the predetermined QoE function, i.e., $\Delta_{QoE}>0$ or $\Delta_{QoE}<0$. Gaming experience controller 206 maintains the QoE vector when $\Delta_{QoE}=0$, or when $\Delta_{QoE}$ is within a predetermined range that is substantially close to 0.

Non-limiting examples of gaming experience controller 206 altering game 104 may include increasing a delay of a gaming device in response to the gamer's operations, increasing a difficulty level of the game, modifying a scene of the game, and repeating a game task. Other examples for altering game 104 may include playing a predetermined exciting music selection, decreasing a difficulty level of the game, offering one or more rewards to the gamer, and modifying a scene of the game. In accordance with various examples, gaming experience controller 206 may be implemented as hardware, software, firmware, or any combination thereof.

Thus, example configuration 200 may include QoE function generator 202 configured to generate a QoE function; comparison module 204 configured to compare the QoE vector, generated by QoE monitor 108, with a corresponding value of the QoE function; and gaming experience controller 206 configured to adjust the gaming experience of user 102 according to the comparison result.

Figure 3:
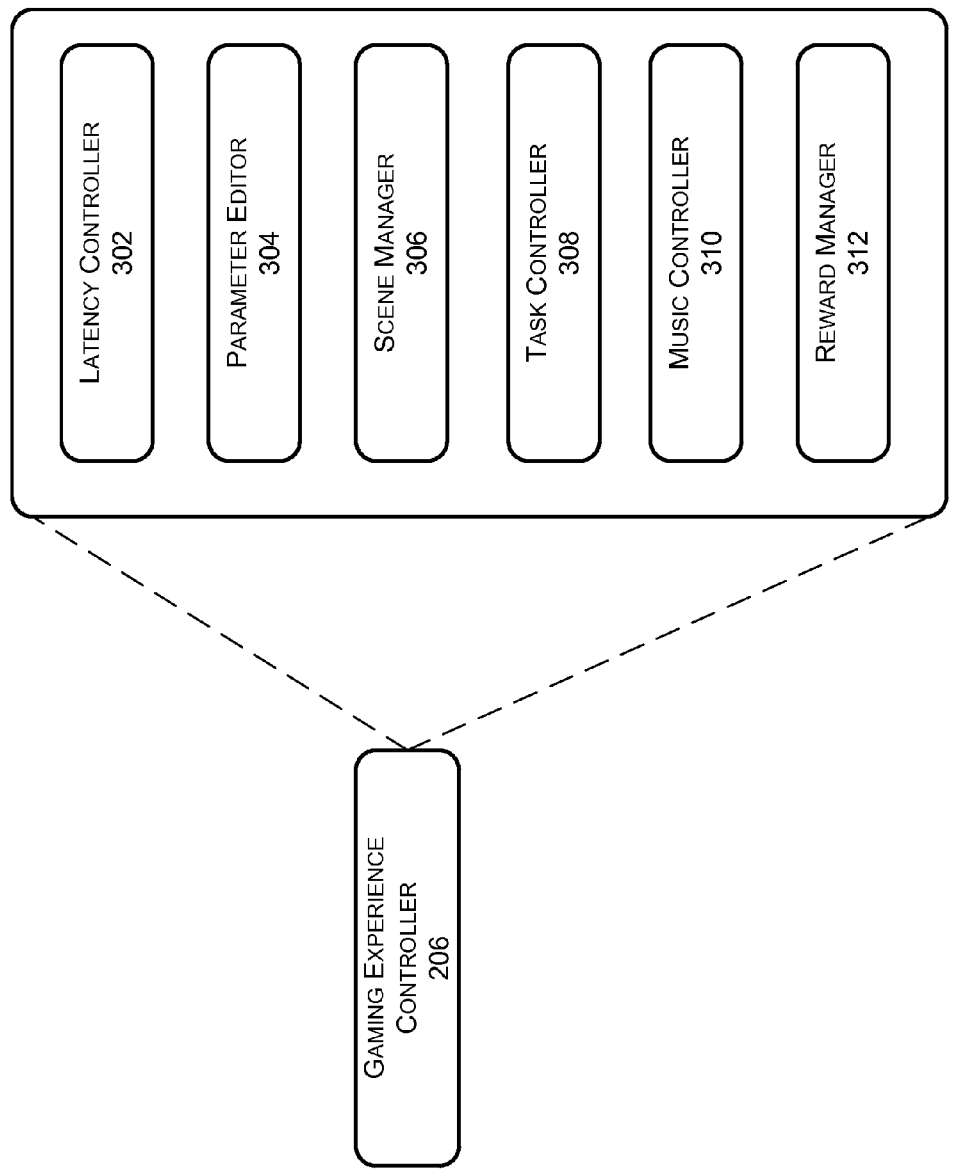
FIG. 3 shows an example configuration of a gaming experience controller by which dynamic gaming experience adjustments may be implemented.

FIG. 3 shows an example configuration 300 of gaming experience controller 206 by which gaming experience adjusting may be implemented, arranged in accordance with at least some embodiments described herein. As depicted, gaming experience controller 206, described above with regard to FIG. 2, may include at least a latency controller 302, a parameter editor 304, a scene manager 306, a task controller 308, a music controller 310, and a reward manager 312.

Latency controller 302 may refer to a component configured to increase a latency of gaming device 106 or to decrease the latency of gaming device 106 to alter game 104. As a non-limiting example, latency controller 302 may implemented by hook functions provided by Microsoft Windows®. In accordance with other various embodiments, latency controller 302 may be implemented as hardware, software, firmware, or any combination thereof.

Parameter editor 304 may refer to a component configured to modify multiple parameters of game 104. Non-limiting examples of the parameters may include the difficulty level of game 104, a defense and/or an attack power of a virtual adversary, the artificial intelligence of the virtual adversary, etc. Specifically, assuming the software provider of game 104 permits the modification, for example, parameter editor 304 may increase the level of difficulty of game 104 to decrease the QoE vector. In yet another example, parameter editor 304 may be configured to decrease the defense power of the virtual adversary so that user 102 may defeat the adversary faster than usual and, thus, to increase the QoE vector of user 102. In accordance with various embodiments, parameter editor 304 may be implemented as hardware, software, firmware, or any combination thereof.

Scene manager 306 may refer to a component configured to modify a virtual scene of game 104. For example, as an example for altering game 104 to further affect the QoE vector, scene manager 306 may be configured to simplify the virtual scene so that the virtual scene becomes less attractive or appealing to user 102. As another example to alter game 104 to further affect the QoE vector, scene manager 306 may be configured to increase the details of the virtual scene, e.g., adding attractive features to the virtual scene or improving the graphics of the depicted features, so that the virtual scene becomes more attractive or appealing to user 102. In accordance with various embodiments, scene manager 306 may be implemented as hardware, software, firmware, or any combination thereof.

Task controller 308 may refer to a component configured to provide different game tasks to user 102. For example, to alter game 104 and to further affect the QoE vector, task controller 308 may be configured to repeatedly generate one or more gaming tasks for user 102 to accomplish so that user 102 may be frustrated and lose patience with game 104. In another example to alter game 104 and to further affect the QoE vector, task controller 308 may be configured to generate a variety of gaming tasks for user 102 so that user 102 may remain interested in game 104. In accordance with various embodiments, task controller 308 may be implemented as hardware, software, firmware, or any combination thereof.

Music controller 310 may refer to a component configured to control the background music of game 104. For example, to affect the QoE vector, music controller 310 may be configured to play exciting background music, as some research has shown that exciting music may cause human brains to release more dopamine to induce feelings of happiness. In accordance with various embodiments, music controller 310 may be implemented as hardware, software, firmware, or any combination thereof.

Reward manager 312 may refer to a component configured to manage virtual rewards provided for user 102 when user 102 accomplishes a gaming task. For example, to alter game 104, reward manager 312 may be configured to provide less virtual rewards, e.g., less virtual currency, than user 102 would expect so that user 102 may be frustrated. As another example to alter game 104, reward manager 312 may be configured to give more virtual rewards than user 102 would expect so that user 102 may be encouraged. In accordance with various embodiments, reward manager 312 may be implemented as hardware, software, firmware, or any combination thereof.

Figure 4:
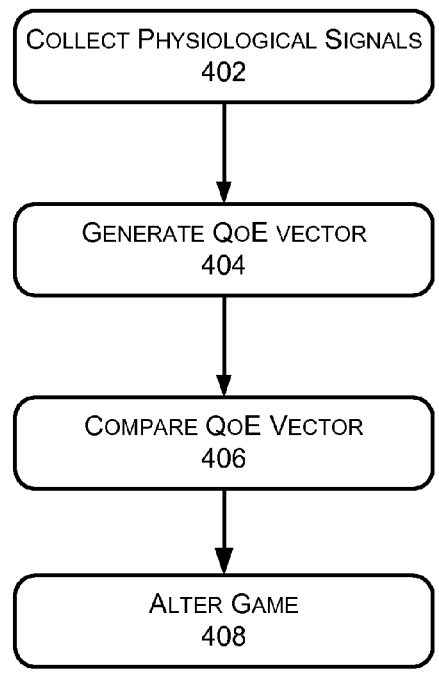
FIG. 4 shows an example processing flow of operations by which dynamic gaming experience adjustments may be implemented.

FIG. 4 shows an example processing flow 400 of operations by which gaming experience adjusting may be implemented, arranged in accordance with at least some embodiments described herein. As depicted, processing flow 400 may include sub-processes executed by various components that are part of example system 100. However, processing flow 400 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 400 may include various operations, functions, or actions as illustrated by one or more of blocks 402, 404, 406, and/or 408. Processing may begin at block 402.

Block 402 (Collect Physiological Signals) may refer to QoE monitor 108 periodically collecting one or more physiological signals from user 102 as user 102 plays game 104. The physiological signals may include at least one of blood pressure, breath frequency, pulse, voice characteristics (tone, pitch, volume, etc.), facial expression, changes in body temperature, brain activity, etc. Thus, the periodically collected physiological signals may indicate the emotional responses of user 102 at various times while playing game 104. Block 402 may be followed by block 404.

Block 404 (Generate QoE Vector) may refer to QoE monitor 108 generating a QoE vector that indicate a gaming experience of user 102 based on the collected physiological signals. QoE monitor 108 may further be configured to digitize the physiological signals to generate the QoE vector. The QoE vector may refer to a vector, each element of which may represent a value of one of the digitized physiological signals. For example, a QoE vector may be generated based on collected physiological signals including blood pressure, breath, and pulse. For example, the QoE vector may then be referred to as $\vec{e_i} = \{w_1, w_2, w_3\}$, where $w_1$ represents a digitized value of the blood pressure of user 102, $w_2$ represents a digitized value of the breathing rate of user 102, and $w_3$ represents a digitized value of the pulse of user 102. Block 404 may be followed by block 406.

Block 406 (Compare QoE Vector) may refer to comparison module 204 comparing the QoE vector, periodically generated by QoE monitor 108, with a corresponding value of a predetermined QoE function. The distinction between the generated QoE vector and the corresponding value may be calculated as $$\Delta_{QoE} = |\vec{e_i}| - e_i^c = \frac{|\alpha \cdot w_1 + \beta \cdot w_2 + \gamma \cdot w_3|}{h} - e_i^c,$$

where $\alpha$, $\beta$, $\gamma$, and h are representative of adjustable parameters. The adjustable parameters may each be customized to indicate the importance of a type of the physiological signals in measuring the emotional responses of user 102. Block 406 may be followed by block 408.

Block 408 (Alter Game) may refer to gaming experience controller 206 altering game 104 based on the comparison result generated by comparison module 204. That is, gaming experience controller 206 may be configured to alter game 104 in response to a determination that the QoE vector is greater or less than the corresponding value of the predetermined QoE function, i.e., $\Delta_{QoE} > 0$ or $\Delta_{QoE} < 0$. Gaming experience controller 206 d maintains the QoE vector when $\Delta_{QoE} = 0$, or when $\Delta_{QoE}$ is within a predetermined range that is substantially close to 0.

Non-limiting examples for altering game 104 may include increasing a latency of a gaming device in response to the gamer's operations, increasing a difficulty level of the game, modifying a scene of the game, and repeating a game task.

Other examples for altering game 104 may include playing a predetermined exciting music selection, decreasing a difficulty level of the game, offering one or more rewards to the gamer, and modifying a scene of the game.

Thus, FIG. 4 shows an example processing flow for dynamically adjusting the gaming experience of a game in accordance with multiple collected physiological signals that indicate the emotional responses of the gamer.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
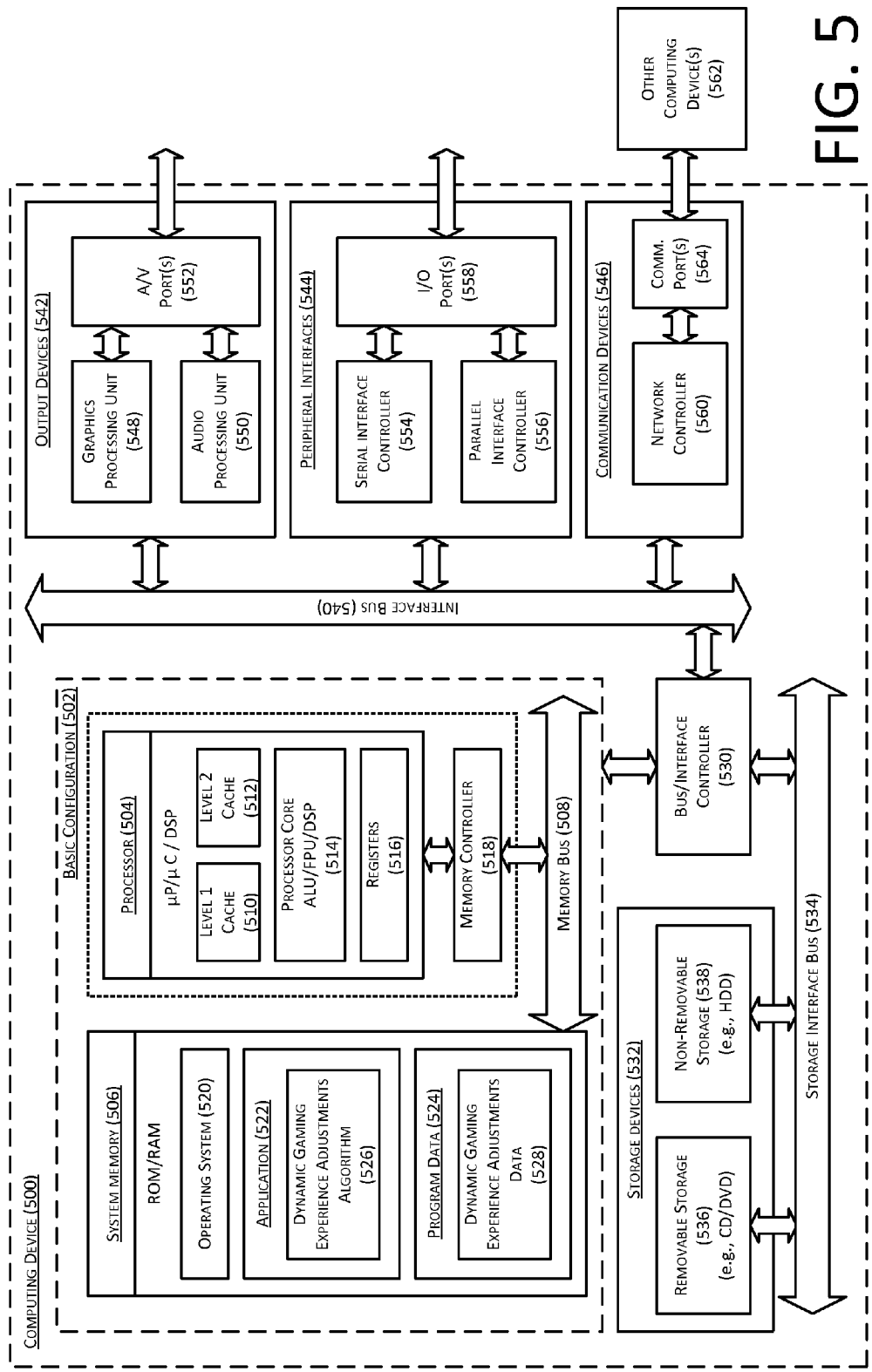
FIG. 5 shows a block diagram illustrating an example computing device that is arranged for dynamic gaming experience adjustments, all arranged in accordance with at least some embodiments described herein.

FIG. 5 shows a block diagram illustrating an example computing device that is arranged for gaming experience adjusting, all arranged in accordance with at least some embodiments described herein. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (μP), a microcontroller (μC), a digital signal processor (DSP), or any combination thereof. Processor 504 may include one or more levels of caching, such as a level one cache 510 and a level two cache 512, a processor core 514, and registers 516. An example processor core 514 may include an arithmetic logic unit (ALU), a floating point unit (FPU), a digital signal processing core (DSP core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include a dynamic gaming experience adjustments algorithm 526 that is arranged to perform the functions as described herein including those described with respect to process 400 of FIG. 4. Program data 524 may include dynamic gaming experience adjustments data 528 that may be useful for operation with dynamic gaming experience adjustments algorithm 526 as is described herein. In some embodiments, application 522 may be arranged to operate with program data 524 on operating system 520 such that implementations of dynamic gaming experience adjustments may be provided as described herein. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disc (CD), a digital versatile disc (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably coupleable", to each other to achieve the desired functionality. Specific examples of operably coupleable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method to adjust gaming experience of a game, the method comprising:
    collecting one or more physiological signals from a gamer as the gamer is playing the game;
    receiving personal information from the gamer;
    selecting a Quality of Experience (QoE) function from one or more specific QoE functions based on the personal information, wherein the QoE function is indicative of a target emotion of the gamer while playing the game;

generating, based on the one or more physiological signals, a QoE vector that indicates a gaming experience of the gamer;

comparing the generated QoE vector with a corresponding value of the selected QoE function, wherein the comparison of the generated QoE vector with the corresponding value of the selected QoE function is based on one or more adjustable parameters, and wherein each of the one or more adjustable parameters is customized based on importance of a type of particular physiological signal of the one or more physiological signals; and altering the game based on the comparison.

2. The method of claim 1, wherein the altering includes altering the game, responsive to a determination that the generated QoE vector is greater than the corresponding value of the selected QoE function.

3. The method of claim 1, wherein the altering includes altering the game, responsive to a determination that the generated QoE vector is less than the corresponding value of the selected QoE function.

4. The method of claim 1, wherein the collecting the one or more physiological signals include collecting at least one of blood pressure, breath frequency, pulse, voice, facial expression, or brain activities.

5. The method of claim 1, wherein the generating the QoE vector includes generating the QoE vector that includes one or more elements, and wherein each element of the one or more elements represents one of the one or more physiological signals.

6. The method of claim 1, wherein the corresponding value of the selected QoE function varies in accordance with a time value.

7. The method of claim 2, wherein the altering the game, responsive to the determination that the generated QoE vector is greater than the corresponding value of the selected QoE function, comprises at least one of:
increasing a delay of a gaming device in response to the gamer's operations;
increasing a difficulty level of the game;
modifying a scene of the game; and
repeating a game task.

8. The method of claim 3, wherein the altering the game, responsive to the determination that the generated QoE vector is less than the corresponding value of the selected QoE function, comprises at least one of:
playing a predetermined music selection;
decreasing a difficulty level of the game;
offering one or more rewards to the gamer; and
modifying a scene of the game.

9. The method of claim 1, wherein the personal information includes one or more of gender, age, physical condition, and medical history.

10. A system, comprising:
a signal collector configured to:
collect one or more physiological signals from a gamer as the gamer is playing a game hosted on a gaming device,
receive personal information from the gamer, and
generate, based on the one or more physiological signals, a Quality of Experience (QoE) vector that indicates gaming experience of the gamer; and
a control module, communicatively coupled to the signal collector, wherein the control module is configured to:
select a QoE function from one or more specific QoE functions based on the personal information, wherein the QoE function is indicative of a target emotion of the gamer while playing the game,
compare the generated QoE vector with a corresponding value of the selected QoE function, wherein the comparison of the generated QoE vector with the corresponding value of the selected QoE function is based on one or more adjustable parameters, and wherein each of the one or more adjustable parameters is customized based on importance of a type of particular physiological signal of the one or more physiological signals, and
alter the game, responsive to a determination that the generated QoE vector is greater or less than the corresponding value of the selected QoE function.

11. The system of claim 10, wherein the one or more physiological signals include at least one of blood pressure, breath frequency, pulse, voice, facial expression, or brain activities.

12. The system of claim 9, wherein the generated QoE vector includes one or more elements, and wherein each element of the one or more elements represents one of the one or more physiological signals.

13. The system of claim 10, wherein the corresponding value of the selected QoE function varies in accordance with a time value.

14. The system of claim 10, wherein the control module is configured to alter the game, responsive to the determination that the generated QoE vector is greater than the corresponding value of the selected QoE function, by at least one of:
increasing a delay of the gaming device in response to the gamer's operations;
increasing a difficulty level of the game;
modifying a scene of the game; and
repeating a game task.

15. The system of claim 10, wherein the control module is configured to alter the game, responsive to the determination that the generated QoE vector is less than the corresponding value of the selected QoE function, by at least one of:
playing a predetermined music selection;
decreasing a difficulty level of the game;
offering one or more rewards to the gamer; and
modifying a scene of the game.

16. The system of claim 10, wherein the personal information includes one or more of gender, age, physical condition, and medical history.

17. A non-transitory medium that stores executable-instructions that, when executed, cause one or more processors to perform operations that comprise:
receive one or more physiological signals of a gamer from a signal collector when the gamer is experiencing a game;
receive personal information from the gamer;
select a Quality of Experience (QoE) function from one or more specific QoE functions based on the personal information, wherein the QoE function is indicative of a target emotion of the gamer while playing the game;
receive, from the signal collector, a QoE vector generated based on the one or more physiological signals to indicate gaming experience of the gamer;
compare the generated QoE vector with a corresponding value of the selected QoE function, wherein the comparison of the generated QoE vector with the corresponding value of the selected QoE function is based on one or more adjustable parameters, and wherein each of the one or more adjustable parameters is customized based on importance of a type of particular physiological signal of the one or more physiological signals; and alter the game, responsive to a determination that the generated QoE vector is not equal to the corresponding value of the selected QoE function.

18. The non-transitory medium of claim 17, wherein the one or more physiological signals include at least one of blood pressure, breath frequency, pulse, voice, facial expression, or brain activities.

19. The non-transitory medium of claim 15, wherein the generated QoE vector includes one or more elements, and wherein each element of the one or more elements represents one of the one or more physiological signals.

20. The non-transitory medium of claim 17, wherein the corresponding value of the selected QoE function varies in accordance with a time value.

21. The non-transitory medium of claim 17, wherein the alteration of the game, responsive to a determination that the generated QoE vector is greater than the corresponding value of the selected QoE function, comprises at least one of:

increasing a delay of a gaming device in response to the gamer's operations;
increasing a difficulty level of the game;
modifying a scene of the game; and
repeating a game task.

22. The non-transitory medium of claim 17, wherein the alteration of the game, responsive to a determination that the generated QoE vector is less than the corresponding value of the selected QoE function, comprises at least one of:

playing a predetermined music selection;
decreasing a difficulty level of the game;
offering one or more rewards to the gamer; and
modifying a scene of the game.

23. The non-transitory medium of claim 17, wherein the personal information includes one or more of gender, age, physical condition, and medical history.

* * * * *